(12) United States Patent
Beers et al.

(10) Patent No.: US 12,110,900 B2
(45) Date of Patent: Oct. 8, 2024

(54) AIR CYCLE MACHINE BYPASS DUCT (71) Applicant: Hamilton Sundstrand Corporation, Charlotte, NC (US)

(72) Inventors: Craig M. Beers, Wethersfield, CT (US); John H. Paliulis, South Windsor, CT (US); Darryl Colson, West Suffield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/095,835

(22) Filed: Jan. 11, 2023

(65) Prior Publication Data
US 2024/0229810 A1 Jul. 11, 2024

(51) Int. Cl.
*B64D 13/06* (2006.01)
*F04D 27/00* (2006.01)

(52) U.S. Cl.
CPC ........... *F04D 27/009* (2013.01); *B64D 13/06* (2013.01); *B64D 2013/0603* (2013.01); *F05D 2220/34* (2013.01); *F05D 2260/213* (2013.01); *F05D 2260/606* (2013.01)

(58) Field of Classification Search
None
See application file for complete search history.

(56) References Cited

U.S. PATENT DOCUMENTS

| | | | | |
|---|---|---|---|---|
| 5,918,472 A * | 7/1999 | Jonqueres | .............. | B64D 13/06 62/402 |
| 6,199,387 B1 * | 3/2001 | Sauterleute | ............ | B64D 13/06 62/87 |
| 6,257,003 B1 | 7/2001 | Hipsky | | |
| 7,334,423 B2 * | 2/2008 | Bruno | ..................... | F25B 9/004 62/402 |
| 8,365,550 B2 | 2/2013 | Voegel | | |
| 8,418,495 B2 | 4/2013 | Merritt et al. | | |
| 9,656,755 B2 | 5/2017 | Durbin et al. | | |
| 10,155,592 B2 | 12/2018 | McAuliffe et al. | | |
| 10,934,007 B2 | 3/2021 | Ho et al. | | |
| 11,377,216 B2 | 7/2022 | Sautron | | |
| 2014/0352348 A1 | 12/2014 | Army et al. | | |
| 2015/0107261 A1 * | 4/2015 | Moes | ..................... | B64D 41/00 60/785 |

FOREIGN PATENT DOCUMENTS

WO 2022263962 A1 12/2022

OTHER PUBLICATIONS

Extended European Search Report for European Patent Application No. 24151422.3, May 10, 2024, 8 Pages.

* cited by examiner

*Primary Examiner* — Kayla Mccaffrey
(74) *Attorney, Agent, or Firm* — Kinney & Lange, P.A.

(57) ABSTRACT

An environmental control system includes a rotary machine, a first bypass duct, and a first check valve in the first bypass duct. The rotary machine includes a compressor section and a first turbine section. Each section of the rotary machine includes an inlet, an outlet, a duct extending between the inlet and the outlet, and an impeller in the duct. The rotary machine also includes a tie rod mechanically connecting the compressor impeller and the first turbine impeller. The first bypass duct is between the compressor section and the first turbine inlet. The check valve opens the first bypass duct when an air pressure in the compressor inlet is higher than an air pressure in the first turbine inlet.

15 Claims, 5 Drawing Sheets

AIR CYCLE MACHINE BYPASS DUCT

BACKGROUND

This application relates to rotary machines for environmental control systems and, more particularly, starting rotary machines.

Environmental control systems for aircraft use an air cycle machine, heat exchangers, and water collectors to cool, pressurize, and humidify air for use in passenger cabins and electronics bays. Air cycle machines are typically self-starting and use drive force of air moving through turbine impellers to overcome drag torque created by bearings and seals in the air cycle machine.

Environmental control systems may include additional components (for example, multiple heat exchangers) between a compressor section and a turbine section of an air cycle machine. Each additional component creates a pressure drop that reduces inlet pressure of the turbine section and a resultant drive torque created by the turbine section.

SUMMARY

An environmental control system includes a rotary machine, a first bypass duct, and a first check valve in the first bypass duct. The rotary machine includes a compressor section with an inlet, an outlet, a duct extending between the inlet and the outlet, and an impeller in the duct. The rotary machine also includes a first turbine section with an inlet, an outlet, a duct extending between the inlet and the outlet, and an impeller in the duct. The rotary machine also includes a tie rod mechanically connecting the compressor impeller and the first turbine impeller. The first bypass duct is between the compressor inlet and the first turbine inlet. The check valve opens the first bypass duct when an air pressure in the compressor inlet is higher than an air pressure in the first turbine inlet.

An environmental control system includes a rotary machine, a bypass duct, and a check valve in first bypass duct. The rotary machine includes a compressor section with an inlet, an outlet, a duct extending between the inlet and the outlet, and an impeller in the duct. The rotary machine also includes a turbine section with an inlet, an outlet, a duct extending between the inlet and the outlet, and an impeller in the duct. The rotary machine also includes a tie rod mechanically connecting the compressor impeller and the turbine impeller. The bypass duct is between the compressor inlet and the turbine inlet. The check valve opens first bypass duct when an air pressure in the compressor inlet is higher than an air pressure in the turbine inlet.

An environmental control system includes a rotary machine, a first bypass duct, a first check valve in the first bypass duct, a second bypass duct, and a second check valve in the second bypass duct. The rotary machine includes a compressor section with an inlet, an outlet, a duct extending between the inlet and the outlet, and an impeller in the duct. The rotary machine also includes a first turbine section with an inlet, an outlet, a duct extending between the inlet and the outlet, and an impeller in the duct. The rotary machine also includes a second turbine section with an inlet, an outlet, a duct extending between the inlet and the outlet, and an impeller in the duct. The rotary machine also includes a tie rod mechanically connecting the compressor impeller, the first turbine impeller, and the second turbine impeller. The first bypass duct is between the compressor inlet and the first turbine inlet. The first check valve opens the first bypass duct when an air pressure in the compressor inlet is higher than an air pressure in the first turbine inlet. The second bypass duct is between the first turbine inlet and the second turbine inlet. The second check valve opens the second bypass duct when an air pressure in the first turbine inlet is higher than an air pressure in the second turbine inlet.

DETAILED DESCRIPTION

Figure 1:
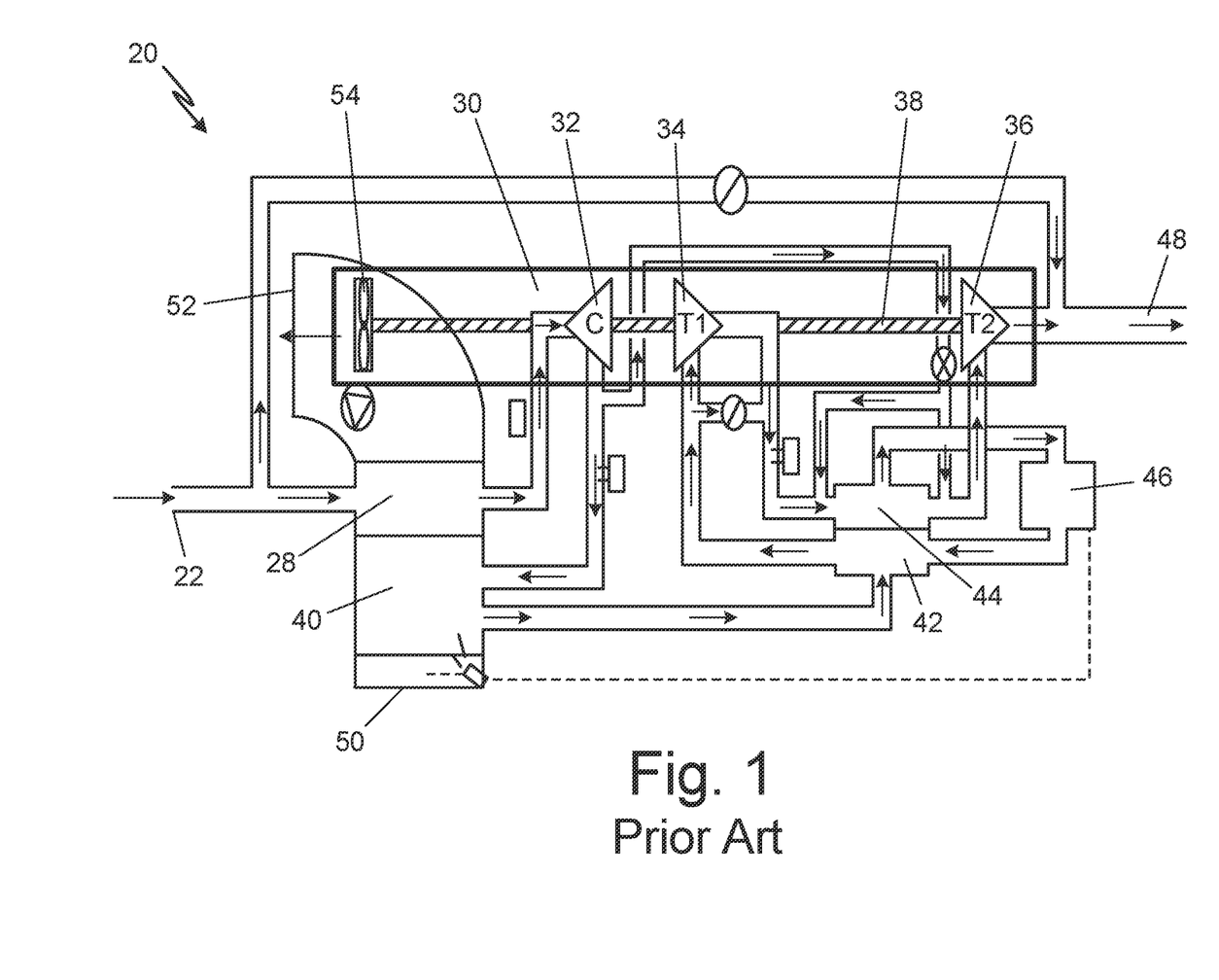
FIG. 1 is a schematic view of a prior art environmental control system using the air cycle machine.

FIG. 1 is a schematic of prior-art environmental control system 20. Environmental control system 20 includes inlet 22, primary heat exchanger 28, air cycle machine 30, compressor (C) 32, first turbine ($T_1$) 34, second turbine ($T_2$) 36, tie rod 38 (shown in FIG. 1A), secondary heat exchanger 40, reheater 42, condenser 44, water extractor 46, pack outlet 92, ram air inlet 50, ram air outlet 52, and ram air fan 54.

Inlet 22 is connected to primary heat exchanger 28 with a duct. Primary heat exchanger 28 is connected to air cycle machine 30 with a duct. Primary heat exchanger 28 is upstream from air cycle machine 30. Air cycle machine 30 includes compressor 32, first turbine 34, and second turbine 36 mounted on tie rod 38. Air cycle machine 30 is connected to secondary heat exchanger 40, reheater 42, condenser 44, and water extractor 46 with ducts. Air cycle machine 30 is further connected to outlet 92 with a duct. Air cycle machine 48 is upstream from outlet 92. Ram air inlet 50 is connected to ram air outlet 52 with a duct. Ram air fan 54 is that is connected to ram air outlet 52.

Environmental control system 20 supplies conditioned air to the aircraft cabin at the proper temperature, pressure, and humidity. Bleed air from an aircraft travels through a duct (not shown) to inlet 22. The bleed air source can be, for example, a gas turbine engine. Alternatively, ram air can be ingested through a ram air inlet (not shown) in a side of the aircraft as a source of air to inlet 22. Air that flows through ram air inlet 50 and out of ram air outlet 52 is ingested through a ram air inlet (not shown) in a side of the aircraft as a source of air to ram air inlet 50.

The air that flows through ram air inlet 50 is drawn across primary heat exchanger 28 and secondary heat exchanger 40 with ram air fan 54. The air in ram air fan 54 is used to cool the air flowing from inlet 22 through primary heat exchanger 28 and secondary heat exchanger 40 to air cycle machine 30. The ram air used for cooling primary heat exchanger 28 and secondary heat exchanger 40 is then dumped overboard through ram air outlet 52.

The air that flows through inlet 22 flows to primary heat exchanger 28. Primary heat exchanger 28 cools the air from the bleed source using the cooling airflow from ram air fan 54. The cooled air then flows to air cycle machine 30. Air cycle machine 30 includes compressor 32, first turbine 34, and second turbine 36 that are all mounted to tie rod 38. The cooled air from primary heat exchanger 28 first flows through compressor 32 of air cycle machine 30. Compressor 32 includes a compressor impeller mounted to a shaft connected to tie rod 38 that is rotated with tie rod 38 to compress the air flowing through compressor 32 of air cycle machine 30. The compressed air from compressor 32 then flows to secondary heat exchanger 40 where it is further cooled with ram air that is pulled across secondary heat exchanger 40 with ram air fan 54.

The cooled air from secondary heat exchanger 40 then flows through a duct to reheater 42 and condenser 44. Air from secondary heat exchanger 40 is cooled in reheater 42. Condenser 44 condenses the cooled air by lowering the air temperature. The condensed air then flows through a duct to water extractor 46, which collects the condensed water out of the air. The air then flows from water extractor 46 through reheater 42, where it is warmed before flowing to first turbine 34 of air cycle machine 30. First turbine 34 of air cycle machine 30 includes a first turbine impeller mounted on a shaft connected to tie rod 38. Energy is extracted from the air expanding through the first turbine impeller of first turbine 34 to drive tie rod 38.

Air from first turbine 34 then flows back through condenser 44. Air from condenser 44 then flows through second turbine 36 of air cycle machine 30. Second turbine 36 also includes a second turbine impeller mounted on a shaft connected to tie rod 38. Energy is extracted from the air expanding through the second turbine impeller of second turbine 36 to drive tie rod 38. Air from second turbine 36 then flows through pack outlet 92 to be delivered to the aircraft cabin or other systems needing conditioned air.

Figure 2:
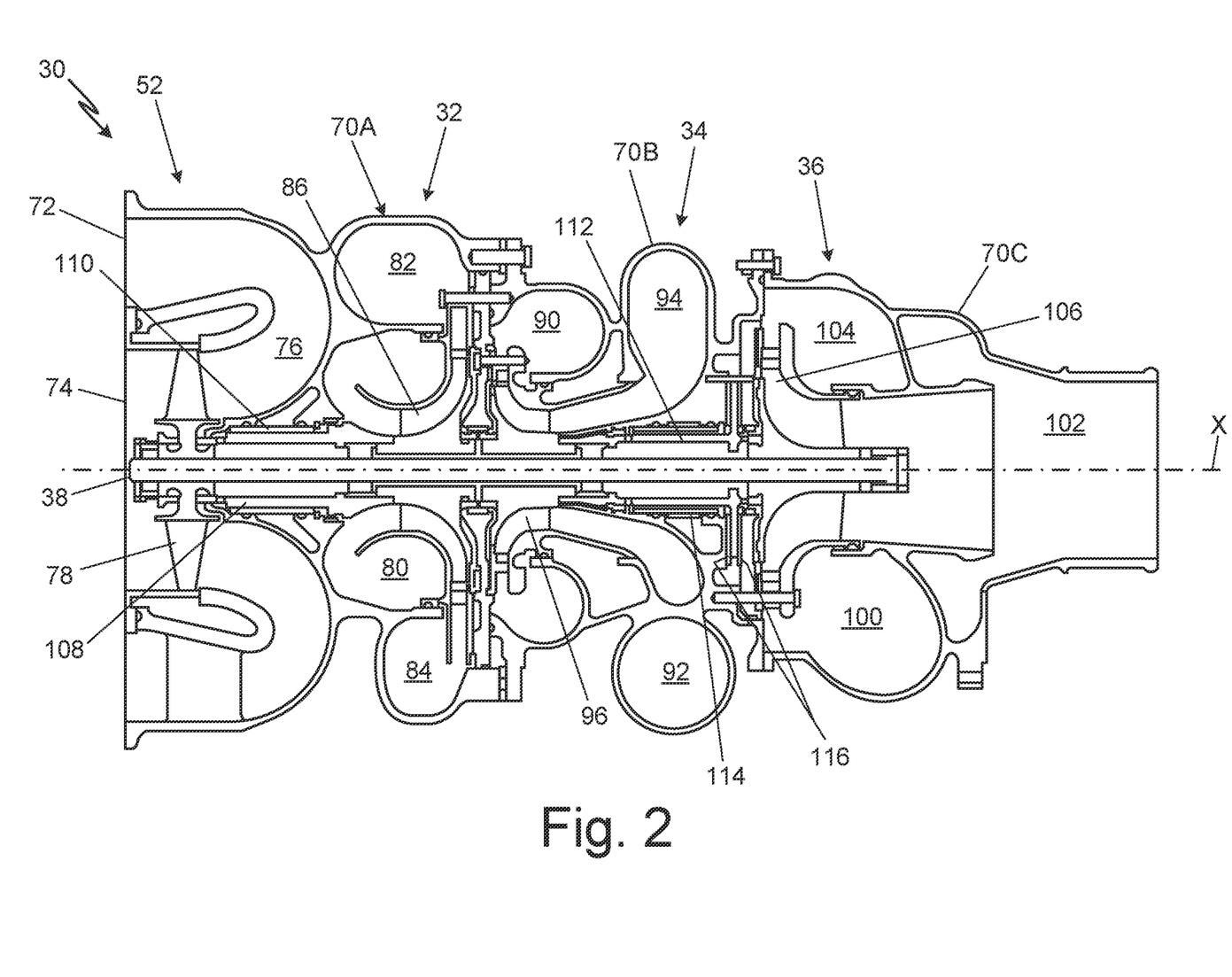
FIG. 2 is a cross-sectional view of an air cycle machine.

FIG. 2 is a cross-sectional view of air cycle machine 30, which includes compressor section 32, first turbine section 34, second turbine section 36, tie rod 38, fan section 52, fan and compressor housing 70A, first turbine housing 70B, and second turbine housing 70C. Fan section 52 includes fan and compressor housing 70A, fan inlet 72, fan outlet 74, fan duct 76, and fan impeller 78. Compressor section 32 includes compressor inlet 80, compressor outlet 82, compressor duct 84, and compressor impeller 86. First turbine section 34 includes first turbine inlet 90, first turbine outlet 92, first turbine duct 94, and first turbine impeller 96. Second turbine section 36 includes second turbine inlet 100, second turbine outlet 102, second turbine duct 104, and second turbine impeller 106. Air cycle machine 30 further includes fan-end shaft 108, fan-end journal bearing 110, turbine-end shaft 112, turbine-end journal bearing 114, thrust bearings 116. Also shown in FIG. 1 is axis X.

In air cycle machine 30, fan section 52, compressor section 32, first turbine section 34, and second turbine section 36 are all mounted on tie rod 38. Tie rod 38 rotates about axis X. Fan and compressor housing 70A is connected to first turbine housing 70B with fasteners. A seal plate is positioned between fan and compressor housing 70A and first turbine housing 70B. First turbine housing 70B is connected to second turbine housing 70C with fasteners. Fan and compressor housing 70A, first turbine housing 70B, and second turbine housing 70C together form an overall housing for air cycle machine 30. Fan and compressor housing 70A houses fan section 52 and compressor section 32. First turbine housing 70B houses first turbine section 34. Second turbine housing 70C houses second turbine section 36.

Fan section 52 includes fan inlet 72, fan outlet 74, fan duct 76, and fan impeller 78. Fan inlet 72 is connected to fan outlet 74 by fan duct 76. Fan impeller 78 is in fan duct 76 adjacent to fan inlet 72 and is mounted to and rotates with tie rod 38. Fan impeller 78 draws air into fan section 52 to be routed through air cycle machine 30. Fan section 52 draws in ram air through a ram air inlet (for example, ram air inlet 52 shown in FIG. 1) and moves the air through fan duct 76 to fan outlet 74. Heat exchangers (for example, primary heat exchanger 28 and secondary heat exchanger 40 shown in FIG. 1) can be positioned within fan duct 76.

Compressor section 32 includes compressor inlet 80, compressor outlet 82, compressor duct 84, and compressor impeller 86. Compressor inlet 80 connects to compressor outlet 82 through compressor duct 84. Compressor impeller 86 is in compressor duct 84 and is mounted to and rotates with tie rod 38. Air flows through compressor section 32 by entering compressor inlet 80. Compressor impeller 86 rotates and increases the velocity of the air. As the air moves through compressor duct 84 downstream of impeller 86, air velocity decreases and air pressure increases. Air exits compressor duct 84 through compressor outlet 82.

First turbine section 34 includes first turbine inlet 90, first turbine outlet 92, first turbine duct 94, and first turbine impeller 96. First turbine inlet 90 connects to first turbine outlet 92 through first turbine duct 94. First turbine impeller 96 is positioned in first turbine duct 94 and is mounted to and rotates tie rod 38. Air flows into first turbine inlet 90 and is ducted through first turbine duct 94 to first turbine outlet 92. First turbine impeller 96 extracts energy from the air passing through first turbine section 34. Extracted energy rotates tie rod 38. The air expands and cools as it moves through first turbine impeller 96.

Second turbine section 36 includes second turbine inlet 100, second turbine outlet 102, second turbine duct 104, and second turbine impeller 106. Second turbine inlet 100 connects to second turbine outlet 102 through second turbine duct 104. Second turbine impeller 106 is positioned in second turbine duct 104 and is mounted to and rotates tie rod 38. Air flows into second turbine inlet 100 and is ducted through second turbine duct 104 to second turbine outlet 102. Second turbine impeller 106 extracts energy from the air passing through second turbine section 36 and rotates tie rod 38. The air expands and cools moving through second turbine impeller 106.

Air cycle machine 30 further includes fan-end shaft 108, fan-end journal bearing 110, turbine-end shaft 112, turbine-end journal bearing 114, thrust bearings 116. Fan-end shaft 108 connects fan impeller 78 and compressor impeller 86 to tie rod 38. Fan-end shaft 108 transfers rotational energy from tie rod 38 into fan impeller 78 and compressor impeller 86. Fan-end journal bearing 110 is positioned around fan-end shaft 108 where fan and compressor housing 70A interfaces with rotating fan-end shaft. Fan-end journal bearing can be, for example, an air foil bearing. Turbine-end shaft 112 connects first turbine impeller 96 and second turbine impeller 106 to tie rod 38. Turbine-end shaft 112 transfers rotational energy from tie rod 38 to first turbine impeller 96 and second turbine impeller 106. Turbine-end journal bearing 114 is positioned around turbine-end shaft 112 where first turbine housing 70B interfaces and second turbine housing 70C interface with turbine-end shaft. Turbine-end shaft 112 can be, for example, an air foil bearing. Thrust bearings 116 are positioned on either side of a radially extended portion of turbine-end shaft 112. One thrust bearing 116 is between turbine-end shaft 112 and first turbine housing 70B. Another thrust bearing 116 is positioned between turbine-end shaft 112 and second turbine housing 70C.

Air cycle machine 30 can be self-starting, meaning air moving through air cycle machine 30 provided by a bleed air source (for example, bleed air from a gas turbine engine) is sufficient to start it without other special assist features. Self-starting requires the drive torques of first turbine impeller 96 and second turbine impeller 106 to overcome the drag torque created by sources of friction in air cycle machine 30. Fan-end journal bearing 110, turbine-end journal bearing 114, thrust bearings 116, and seals (for example, labyrinth seals) are sources of friction in air cycle machine 30.

Air cycle machine 30 starts when air from a bleed air source begins moving through compressor section 32. At first however, compressor section 32 is not compressing the air because compressor impeller 86 is not increasing the air velocity. Then, the air moves through any components of the environmental control system and into first turbine section 34. Air turns first turbine impeller 96, which then turns turbine-end shaft 112 and tie rod 38. Air exits first turbine section 34, flows through any components of the environmental control system to second turbine section 36. Air turns second turbine impeller 106, which also turns turbine-end shaft 112 and tie rod 38. Movement of first turbine impeller 96 and second turbine impeller 106 turn tie rod 38, which transfers rotational energy to fan-end shaft 108 and compressor impeller 86. With compressor impeller 86 turning, compressor section 32 begins to compress air, increasing air pressure at first turbine inlet 90 and second turbine inlet 100.

The drive torques of first turbine impeller 96 and second turbine impeller 106 are dependent on air pressure in first turbine inlet 90 and second turbine inlet 100, respectively. For example, a higher air pressure at first turbine inlet 90 means a greater pressure drop across first turbine rotor 96 and increased turbine drive torque generated by first turbine rotor 96. The same is true for second turbine section 36. When air cycle machine 30 is starting, drive torque of first turbine impeller 96 and second turbine impeller 106 on turbine-end shaft 112 and tie rod 38 must overcome drag torque created by sources of friction in air cycle machine 30.

In prior art environmental control system 20, having two turbine impellers (first turbine impeller 96 and second turbine impeller 106) typically produces enough drive torque for air cycle machine 30 to self-start. However, as more components, like heat exchangers, are added to an environmental control system, inlet pressures at first turbine inlet 90 and second turbine inlet 100 drop. The added components reduce air pressure as air flows through them. This reduces drive torque produced by first turbine impeller 96 and second turbine impeller 106 potentially below the drag torque created by sources of friction in air cycle machine 30. As more components are added to environmental control systems, air cycle machine 30 has reduced self-starting capabilities.

Air cycle machine 30 is an example air cycle machine utilized in an environmental control system (for example environmental control system 20). Air cycle machine 30 is a two-wheel air cycle machine, meaning it includes two turbine impellers: first turbine impeller 96 and second turbine impeller 106. Air cycle machine 30 can, in alternate embodiments, include more or fewer turbine impellers. In one example, air cycle machine 30 could have a single turbine impeller. In a second example, air cycle machine 30 can include three or more turbine impellers. Additional turbine impellers would also be connected to tie rod 38 with shafts (for example, turbine-end shaft 112).

Figure 3:
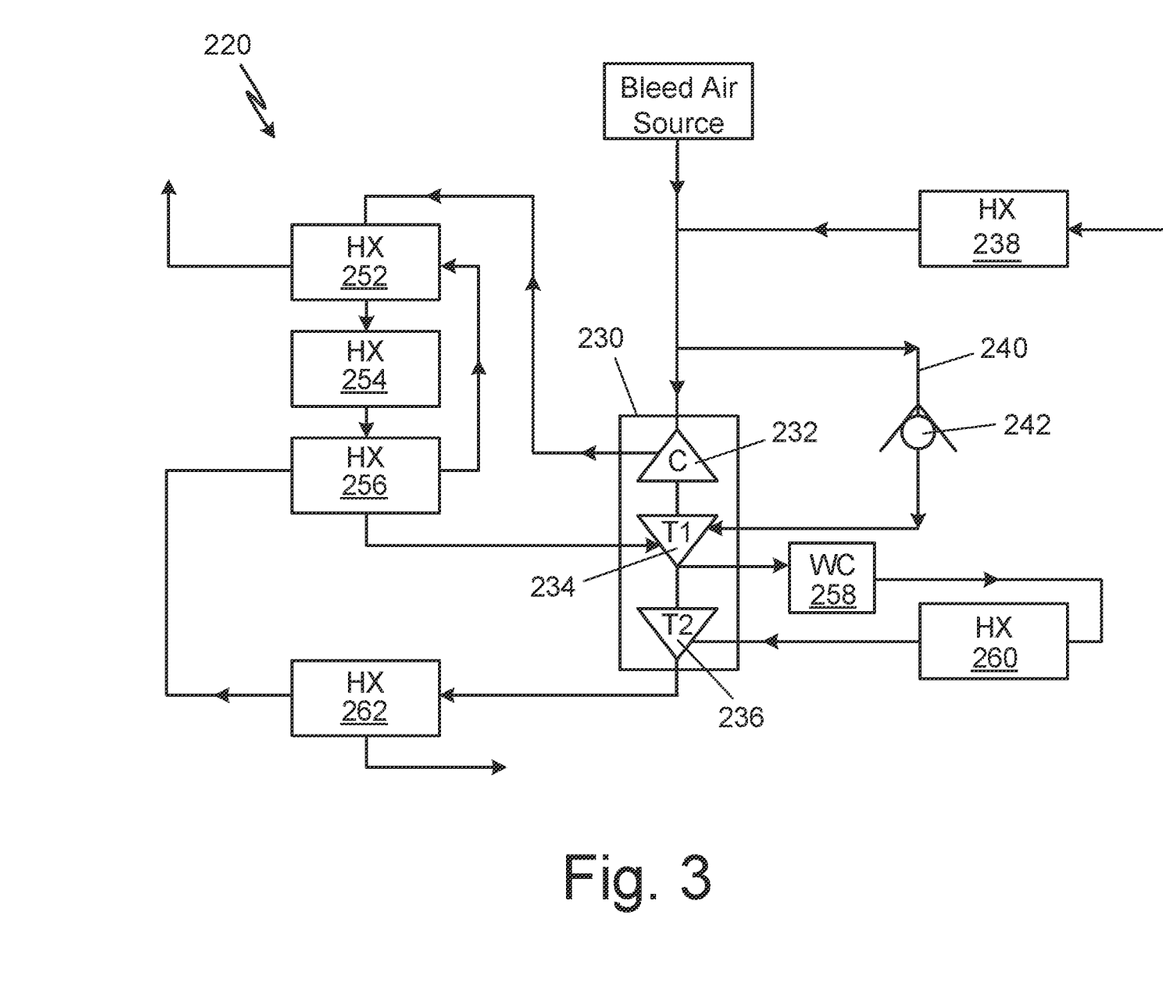
FIG. 3 is a schematic view of a first embodiment of an environmental control system with a bypass valve.

FIG. 3 is a schematic view of environmental control system 220, which includes air cycle machine 230 with compressor section 232, first turbine section 234, and second turbine section 236. Environmental control system 220 also includes fan duct heat exchanger 238, bypass duct 240, bypass valve 242, first heat exchanger 252, second heat exchanger 254, third heat exchanger 256, water collector 258, fourth heat exchanger 260, and fifth heat exchanger 262.

Air cycle machine 230 (with compressor section 232, first turbine 234, and second turbine 236) has the same general structure and function as air cycle machine 30 (with compressor section 32, first turbine section 34, and second turbine section 36) discussed in relation to FIGS. 1-2. An inlet of compressor section 232 connects to fan duct heat exchanger 238. Fan duct heat exchanger 238 is positioned between an inlet to environmental control system 220 and the inlet to compressor section 232. The inlet of compressor section 232 also connects to an inlet of first turbine section 234 via bypass duct 240.

Bypass valve 242 is in bypass duct 240. Bypass valve 242 is a check valve including an internal mechanism that opens when air pressure in the inlet of compressor section 232 is higher than the inlet of first compressor section 234. Internal mechanisms include ball check valves, spring-loaded ball check valves, flapper check valves, spring-loaded flapper check valves, seated check valves, and spring-loaded flapper check valves. An outlet of compressor section 232 is connected to a plurality of heat exchangers including first heat exchanger 252, second heat exchanger 254, and third heat exchanger 256. First heat exchanger 252 is downstream from the outlet of compressor section 232. Second heat exchanger 254 is downstream from first heat exchanger 252. Third heat exchanger is downstream from third heat exchanger 256.

The inlet to first turbine section 234 is downstream from first heat exchanger 252, second heat exchanger 254, and third heat exchanger 256. An outlet of first turbine section 234 connects to water collector 258 and fourth heat exchanger 260 via ducts. Water collector 258 is upstream from fourth heat exchanger 260. Fourth heat exchanger 260 connects to an inlet of second turbine section 236 via a duct. Fifth heat exchanger 262 is downstream from an outlet of second turbine section 262.

Environmental control system 220 takes air from a bleed source (for example, a gas turbine engine) and conditions it to be a proper temperature, pressure, and humidity for use on an aircraft. Air enters environmental control system 220 through an inlet upstream of fan duct heat exchanger 238. When air cycle machine 230 is running, air is compressed by compressor section 232 and moves through the outlet of compressor section 232 to the plurality of heat exchangers including first heat exchanger 252, second heat exchanger 254, and third heat exchanger 256. The air moves sequentially through first heat exchanger 252 to third heat exchanger 256.

The air moves from the third heat exchanger to first turbine section 234, where an impeller extracts energy from the air to turn a tie rod (for example, tie rod 34) in air cycle machine 230. The tie rod spins the impeller in compressor section 232. The air exits first turbine section 234 and is ducted to water collector 258 and fourth heat exchanger 260. The air then moves to the inlet of second turbine section 236 where an impeller extracts energy from the air to turn the tie rod in air cycle machine 230. The air moves through the outlet of second turbine section 236 to fifth heat exchanger 262 then through alternate passageways in third heat exchanger 256 and first heat exchanger 252 and delivered to a final destination in the aircraft.

The air pressure drops as the air moves through each component of environmental control system 220. Specifically, first heat exchanger 252, second heat exchanger 254, third heat exchanger 256, water collector 258, and fourth heat exchanger 260 can affect air pressures at the inlet of first turbine section 234 and the inlet of second turbine section 236, which can affect self-starting abilities of air cycle machine 230. Bypass duct 240 creates an alternate path for the air to move through environmental control system 220 when air cycle machine 230 is starting. When air pressure in the inlet of compressor section 232 is higher than air pressure in the inlet of first turbine section 234 (for example, at startup of air cycle machine 230), bypass valve 242 opens and air flows through bypass duct 240. When bypass valve 242 is open, air is diverted from flowing through first heat exchanger 252, second heat exchanger 254, and third heat exchanger 256. This diversion of air flow increases air pressure at the inlet of first turbine section 234 and results in a higher drive torque of the impeller in first turbine section 234. After air cycle machine 230 is running and compressor section 232 is compressing air, the inlet pressure of first turbine section 234 will be high enough to close bypass valve 242.

Bypass duct 240 helps increase air pressure in the inlet of first turbine section 234, resulting in a higher drive torque created by the impeller and allowing air cycle machine 230 to start. Bypass duct 240 aids the impeller of first turbine section 234 in creating a drive torque higher than a drag torque of air cycle machine 330. Bypass duct 240 allows air cycle machine 230 to start without special assist features like air being sourced from another aircraft system. Bypass duct 240 allows for advances in environmental control system 220 like the inclusion of first heat exchanger 252, second heat exchanger 254, and third heat exchanger 256.

Figure 4:
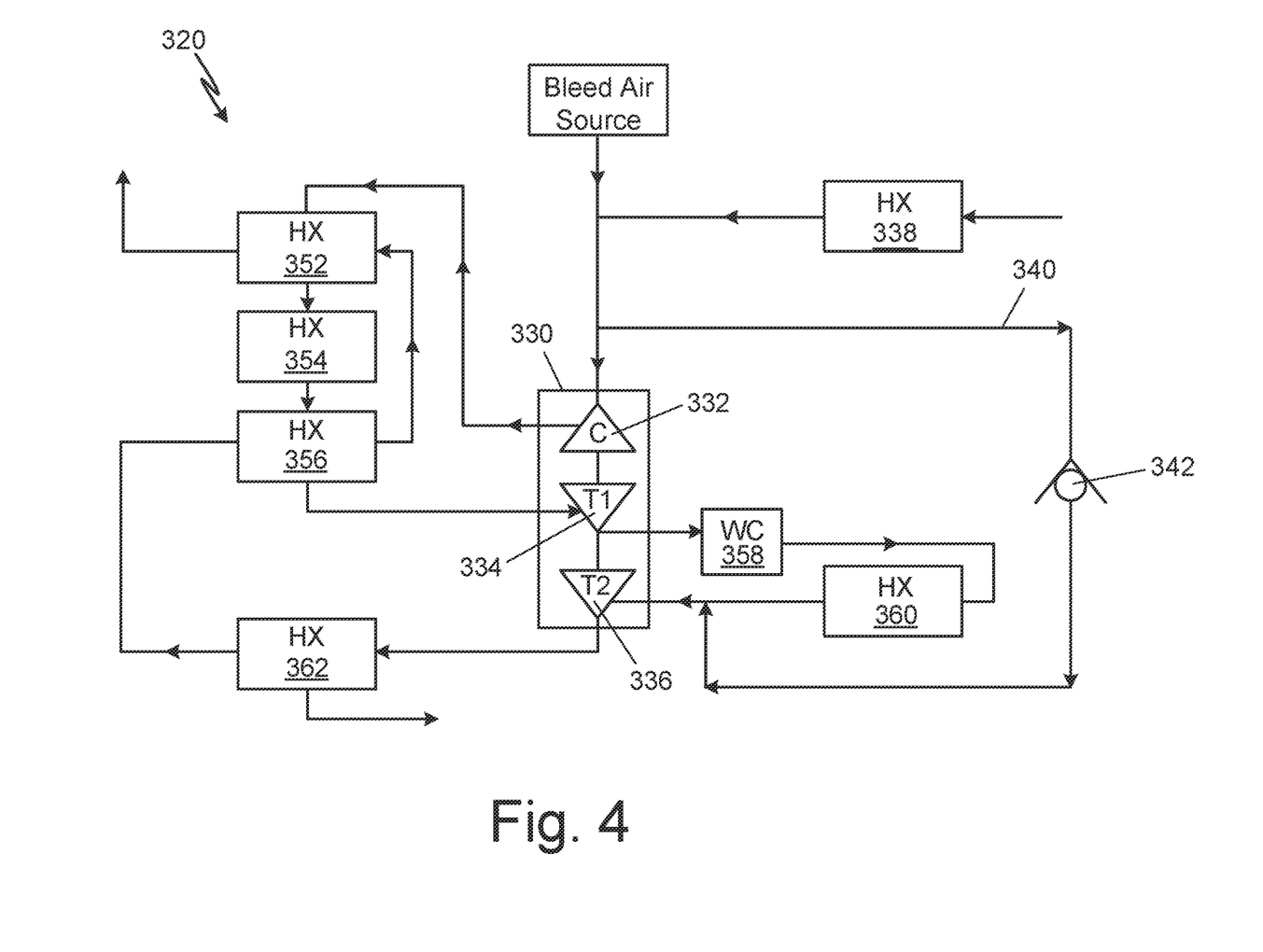
FIG. 4 is a schematic view of a second embodiment of an environmental control system with a bypass valve.

FIG. 4 is a schematic view of environmental control system 320, which includes air cycle machine 330 with compressor section 332, first turbine section 334, and second turbine section 336. Environmental control system 320 also includes fan duct heat exchanger 338, bypass duct 340, bypass valve 342, first heat exchanger 352, second heat exchanger 354, third heat exchanger 356, water collector 358, fourth heat exchanger 360, and fifth heat exchanger 362.

Environmental control system 320 has a similar structure and function as environmental control system 220 shown in FIG. 3 with respect to air cycle machine 330, compressor section 332, first turbine section 334, second turbine section 336, fan duct heat exchanger 338, first heat exchanger 352, second heat exchanger 354, third heat exchanger 356, water collector 358, fourth heat exchanger 360, and fifth heat exchanger 362. Similar components between environmental control system 220 in FIG. 3 have been incremented by one hundred in environmental control system 320 in FIG. 4.

Environmental control system 320 has bypass duct 340 and bypass valve 342. Bypass valve 338 is positioned between an inlet to compressor section 332 and an inlet to second turbine section 336. Bypass valve 342 is positioned in bypass duct 340. Bypass duct 340 routes air around first heat exchanger 352, second heat exchanger 354, third heat exchanger 356, water collector 358, and fourth heat exchanger 360. Bypass valve 342 is a check valve including an internal mechanism that opens when air pressure in the inlet of compressor section 332 is higher than the inlet of second turbine section 336. Internal mechanisms include ball check valves, spring-loaded ball check valves, flapper check valves, spring-loaded flapper check valves, seated check valves, and spring loaded flapper check valves.

Bypass duct 340 and bypass valve 342 help increase drive torque second turbine 336 when air cycle machine 330 is starting. Air working to start air cycle machine 330 can avoid first heat exchanger 352, second heat exchanger 354, third heat exchanger 356, water collector 358, and fourth heat exchanger 360 and enter second turbine 336 with a higher air pressure. This allows for the impeller of second turbine section 336 to create a greater drive. This increased drive torque can combine with drive torque created by first turbine 334 to start air cycle machine 330. Once compressor 332 is spinning and compressing air, the air pressure in the inlet of second turbine 336 will permit bypass valve 342 to close. Closing bypass valve 342 closes bypass duct 348 and air will flow through first heat exchanger 352, second heat exchanger 354, third heat exchanger 356, water collector 358, and fourth heat exchanger 360.

Bypass duct 340 helps increase air pressure in the inlet of second turbine section 336, resulting in a higher drive torque created by the impeller and allowing air cycle machine 330 to start. Bypass duct 340 aids the impeller of second turbine section 334 in creating a drive torque higher than a drag torque of air cycle machine 330. Bypass duct 340 allows air cycle machine 330 to start without special assist features like air being sourced from another aircraft system. Bypass duct 340 allows for advances in environmental control system 320 like the inclusion of first heat exchanger 352, second heat exchanger 354, and third heat exchanger 356.

FIGS. 3-4 show exemplary embodiments of bypass ducts 240 and 340, respectively, in a two-wheel air cycle machine (230 and 330, respectively). Bypass duct 240 extends from the inlet of compressor section 232 to the inlet of first turbine section 234. Bypass duct 340 extends from the inlet of compressor section 332 to the inlet of second turbine section 336. A bypass duct can also be used to start different configurations of air cycle machines. In a first example, a one-wheel air cycle machine with a single turbine impeller can be configured similarly to environmental control system 220 such that bypass duct 240 is routed to first turbine section 234, which would be the only turbine section in this example. In a second example, a three-wheel air cycle machine could be configured similarly to environmental control system 320. In the second example, bypass duct 340 would connect to an inlet of a third turbine section located on the same tie rod as compressor section 330. Other combinations of bypass duct placement in an air cycle machine with more than two turbine impellers are contemplated herein.

Figure 5:
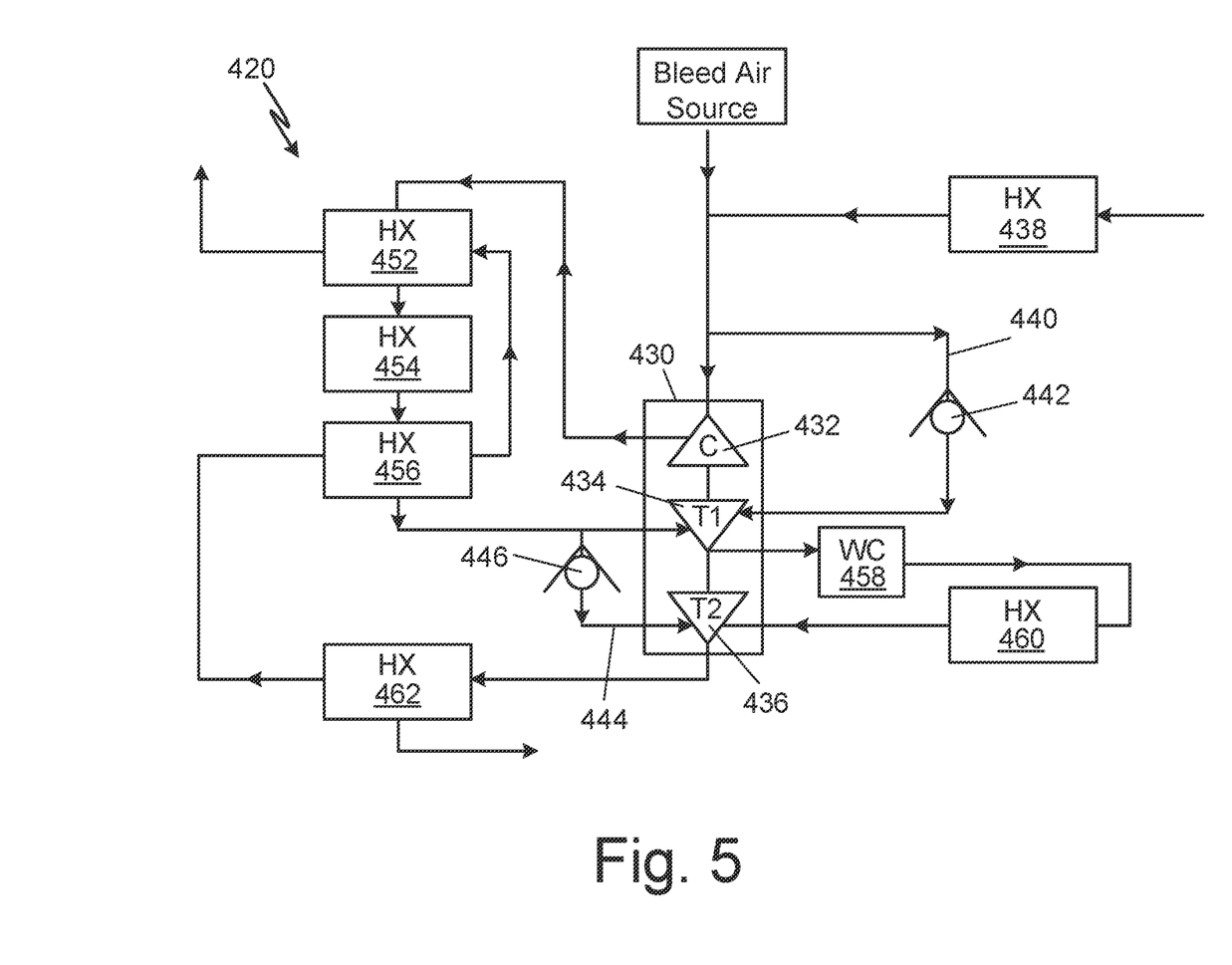
FIG. 5 is a schematic view of a third embodiment of an environmental control system with a bypass valve.

FIG. 5 is a schematic view of environmental control system 420, which includes air cycle machine 430 with compressor section 432, first turbine section 434, and second turbine section 436. Environmental control system 420 also includes fan duct heat exchanger 438, first bypass duct 440 with first bypass valve 442 and second bypass duct 444 with second bypass valve 446. Environmental control system also includes first heat exchanger 352, second heat exchanger 454, third heat exchanger 456, water collector 458, fourth heat exchanger 460, and fifth heat exchanger 462.

Environmental control system 420 has a similar structure and function as environmental control system 220 with respect to air cycle machine 430 (with compressor section 432, first turbine section 434, and second turbine section 436), fan duct heat exchanger 438, first bypass duct 440, first bypass valve 442, first heat exchanger 452, second heat exchanger 454, third heat exchanger 456, water collector 458, fourth heat exchanger 460, and fifth heat exchanger 462. Comparable components in FIG. 5 are incremented by two-hundred compared to components in FIG. 3. Environmental control system 420 includes second bypass duct 444 and second bypass valve 446.

Second bypass duct 444 is between an inlet of first turbine section 434 and an inlet of second turbine section 436. Second bypass valve 446 is in second bypass duct 444. Second bypass valve 446 is a check valve including an internal mechanism that opens when air pressure in the inlet of first turbine section 434 is higher than the inlet of second turbine section 436. Internal mechanisms include ball check valves, spring-loaded ball check valves, flapper check valves, spring-loaded flapper check valves, seated check valves, and spring-loaded flapper check valves. When air cycle machine 430 is starting, a difference between air pressure in the inlet of first turbine section 434 and air pressure in the inlet of second turbine section 436 causes second bypass valve 446 to open. Air can then move from downstream of third heat exchanger 456 to the inlet of second turbine section 436 without moving through first turbine section 434, water collector 458, and second fourth heat exchanger 460. Second bypass duct 444 delivers air at a higher pressure to the inlet of second turbine section 436, increases a pressure drop in air as it moves across an impeller in second turbine section 436, which increases drive torque of the impeller in second turbine section 436 to overcome drag torque of air cycle machine 430.

First bypass duct 440 and second bypass duct 444 combine to increase drive torque created by both first turbine section 434 and second turbine section 436. First bypass duct 440 and second bypass duct 444 help increase air pressure in the inlet of first turbine section 434 and second turbine section 436, resulting in a higher drive torque created by the impellers and allowing air cycle machine 430 to start. First bypass duct 440 and second bypass duct 444 aid the impellers of first turbine section 334 and second turbine section 336 in creating a drive torque higher than a drag torque of air cycle machine 430. First bypass duct 440 and second bypass duct 444 allow air cycle machine 430 to start without special assist features like air being sourced from another aircraft system. First bypass duct 440 and second bypass duct 444 allow for advances in environmental control system 420 like the inclusion of first heat exchanger 452, second heat exchanger 454, and third heat exchanger 456.

Environmental control system 420 of FIG. 5 includes two-wheel air cycle machine 430 and two bypass ducts: first bypass duct 440 and second bypass duct 444. Configurations with two or more bypass ducts can be used in air cycle machines with more than two turbine impellers. For example, an environmental control system including a three-wheel air cycle machine could have first bypass duct 440 between the inlet of compressor section 430 and an inlet to a third turbine section. In a second example, the environmental control system including the three-wheel air cycle machine could have second bypass duct 444 between the inlet of first turbine section 434 and the inlet to the third turbine section. In a third example, the environmental control system including the three-wheel air cycle machine could have a third bypass duct between the inlet of second turbine section 436 and the inlet to the third turbine section. Other configurations are contemplated herein.

Configuration and number of bypass ducts (for example, bypass duct 240 of FIG. 3, bypass duct 340 of FIG. 4, and first bypass duct 440 and second bypass duct 444 of FIG. 5) in an environmental control system is based on the number of components (for example, heat exchangers) which lower turbine inlet pressures, the amount of drag force created by the air cycle machine, the number of turbine rotors, and the size of turbine rotors.

Discussion of Possible Embodiments

The following are non-exclusive descriptions of possible embodiments of the present invention.

An environmental control system includes a rotary machine, a first bypass duct, and a first check valve in the first bypass duct. The rotary machine includes a compressor section with an inlet, an outlet, a duct extending between the inlet and the outlet, and an impeller in the duct. The rotary machine also includes a first turbine section with an inlet, an outlet, a duct extending between the inlet and the outlet, and an impeller in the duct. The rotary machine also includes a tie rod mechanically connecting the compressor impeller and the first turbine impeller. The first bypass duct is between the compressor inlet and the first turbine inlet. The check valve opens the first bypass duct when an air pressure in the compressor inlet is higher than an air pressure in the first turbine inlet.

The environmental control system of the preceding paragraph can optionally include, additionally and/or alternatively, any one or more of the following features, configurations and/or additional components:

A further embodiment of the foregoing environmental control system, and further comprising a plurality of heat exchangers between the compressor outlet and the first turbine inlet. The first bypass duct diverts airflow from the plurality of heat exchangers to the first turbine inlet.

A further embodiment of any of the foregoing environmental control systems, wherein the plurality of heat exchangers includes a first heat exchanger downstream from the compressor outlet. The plurality of heat exchangers further includes a second heat exchanger downstream from the first heat exchanger. The plurality of heat exchangers further includes a third heat exchanger downstream from the second heat exchanger.

A further embodiment of any of the foregoing environmental control systems, and further including a second bypass duct between the first turbine inlet and first the second inlet.

A further embodiment of any of the foregoing environmental control systems, and further including a second check valve in the second bypass duct. The second check valve opens the second bypass duct when an air pressure in the first turbine inlet is higher than an air pressure in the second turbine inlet.

A further embodiment of any of the foregoing environmental control systems, and further including a water condenser between the first turbine outlet and the second turbine inlet. The second first bypass duct diverts airflow from the water condenser to the second turbine inlet.

A further embodiment of any of the foregoing environmental control systems, and further including a heat exchanger between the first turbine outlet and the second turbine inlet. The second bypass duct diverts airflow from the heat exchanger to the second turbine inlet.

A further embodiment of any of the foregoing environmental control systems, wherein the water condenser is upstream from the heat exchanger.

A further embodiment of any of the foregoing environmental control systems, wherein the first check valve and the second check valve are chosen from the group consisting of ball check valves, spring-loaded ball check valves, flapper check valves, spring-loaded flapper check valves, seated check valves, and spring loaded flapper check valves.

A further embodiment of any of the foregoing environmental control systems, and further including a heat exchanger downstream from the second turbine section of the rotary machine.

A further embodiment of any of the foregoing environmental control systems, and further including a fan duct heat exchanger upstream from the compressor inlet.

A further embodiment of any of the foregoing environmental control systems, wherein the rotary machine is downstream from a gas turbine engine bleed air source.

An environmental control system includes a rotary machine, a bypass duct, and a check valve in first bypass duct. The rotary machine includes a compressor section with an inlet, an outlet, a duct extending between the inlet and the outlet, and an impeller in the duct. The rotary machine also includes a turbine section with an inlet, an outlet, a duct extending between the inlet and the outlet, and an impeller in the duct. The rotary machine also includes a tie rod mechanically connecting the compressor impeller and the turbine impeller. The bypass duct is between the compressor inlet and the turbine inlet. The check valve opens first bypass duct when an air pressure in the compressor inlet is higher than an air pressure in the turbine inlet.

The environmental control system of the preceding paragraph can optionally include, additionally and/or alternatively, any one or more of the following features, configurations and/or additional components:

A further embodiment of the foregoing environmental control system, and further including a plurality of heat exchangers between the compressor outlet and the turbine inlet. The bypass duct diverts airflow from the plurality of heat exchangers when the check valve is open.

A further embodiment of any of the foregoing environmental control systems, wherein the first check valve and the second check valve are chosen from the group consisting of ball check valves, spring-loaded ball check valves, flapper check valves, spring-loaded flapper check valves, seated check valves, and spring loaded flapper check valves.

A further embodiment of any of the foregoing environmental control systems, and further including a fan duct heat exchanger upstream from the compressor inlet of the rotary machine.

An environmental control system includes a rotary machine, a first bypass duct, a first check valve in the first bypass duct, a second bypass duct, and a second check valve in the second bypass duct. The rotary machine includes a compressor section with an inlet, an outlet, a duct extending between the inlet and the outlet, and an impeller in the duct. The rotary machine also includes a first turbine section with an inlet, an outlet, a duct extending between the inlet and the outlet, and an impeller in the duct. The rotary machine also includes a second turbine section with an inlet, an outlet, a duct extending between the inlet and the outlet, and an impeller in the duct. The rotary machine also includes a tie rod mechanically connecting the compressor impeller, the first turbine impeller, and the second turbine impeller. The first bypass duct is between the compressor inlet and the first turbine inlet. The first check valve opens the first bypass duct when an air pressure in the compressor inlet is higher than an air pressure in the first turbine inlet. The second bypass duct is between the first turbine inlet and the second turbine inlet. The second check valve opens the second bypass duct when an air pressure in the first turbine inlet is higher than an air pressure in the second turbine inlet.

The environmental control system of the preceding paragraph can optionally include, additionally and/or alternatively, any one or more of the following features, configurations and/or additional components:

A further embodiment of the foregoing environmental control system, and further including a plurality of heat exchangers between the compressor outlet and the first turbine inlet. The first bypass duct diverts airflow from the plurality of heat exchangers when the check valve is open.

A further embodiment of any of the foregoing environmental control systems, and further including a water condenser between the first turbine outlet and the second turbine inlet. The second bypass duct diverts airflow from the water condenser to the second turbine inlet.

A further embodiment of any of the foregoing environmental control systems, and further including a heat exchanger between the first turbine outlet and the second turbine inlet and downstream from the water collector. The first bypass duct diverts airflow from the heat exchanger to the second turbine inlet.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. An environmental control system comprising:
   a rotary machine comprising:
     a compressor section comprising:
       a compressor inlet;
       a compressor outlet;
       a compressor duct extending between the compressor inlet and the compressor outlet; and
       a compressor impeller positioned in the compressor duct;
     a first turbine section comprising:
       a first turbine inlet downstream from the compressor outlet;
       a first turbine outlet;
       a first turbine duct extending between the first turbine inlet and the first turbine outlet; and
       a first turbine impeller positioned in the first turbine duct;
     a second turbine section comprising:
       a second turbine inlet downstream from the first turbine outlet;
       a second turbine outlet;
       a second turbine duct extending between the second turbine inlet and the second turbine outlet; and
       a second turbine impeller positioned in the second turbine duct and mechanically connected to the tie rod of the rotary machine; and
     a tie rod mechanically connecting the compressor impeller and the first turbine impeller;
   a first bypass duct between the compressor inlet and the first turbine inlet;
   a first check valve in the first bypass duct, wherein the first check valve opens the first bypass duct when the pressure in the compressor inlet is higher than a pressure in the first turbine inlet;
   a second bypass duct between the first turbine inlet and the second turbine inlet; and
   a second check valve in the second bypass duct, wherein the second check valve opens the second bypass duct when an air pressure in the first turbine inlet is higher than an air pressure in the second turbine inlet.
2. The environmental control system of claim 1, and further comprising:

a plurality of heat exchangers between the compressor outlet and the first turbine inlet; and wherein the first bypass duct diverts airflow from the plurality of heat exchangers to the first turbine inlet.

3. The environmental control system of claim 2, wherein the plurality of heat exchangers comprises:

a first heat exchanger downstream from the compressor outlet;

a second heat exchanger downstream from the first heat exchanger; and a third heat exchanger downstream from the second heat exchanger.

4. The environmental control system of claim 1, and further comprising:

a water condenser between the first turbine outlet and the second turbine inlet; and wherein the second bypass duct diverts airflow from the water condenser to the second turbine inlet.

5. The environmental control system of claim 4, and further comprising:

a heat exchanger between the first turbine outlet and the second turbine inlet; and wherein the second bypass duct diverts airflow from the heat exchanger to the second turbine inlet.

6. The environmental control system of claim 5, wherein the water condenser is upstream from the heat exchanger.

7. The environmental control system of claim 1, wherein the first check valve and the second check valve are chosen from the group consisting of ball check valves, spring-loaded ball check valves, flapper check valves, spring-loaded flapper check valves, seated check valves, and spring-loaded flapper check valves.

8. The environmental control system of claim 1, and further comprising:

a heat exchanger downstream from the second turbine section of the rotary machine.

9. The environmental control system of claim 1, and further comprising:

a fan duct heat exchanger upstream from the compressor inlet.

10. The environmental control system of claim 1, wherein the rotary machine is downstream from a gas turbine engine bleed air source.

11. The environmental control system of claim 1, and further comprising:

a plurality of heat exchangers between the compressor outlet and the first turbine inlet;

wherein the first bypass duct diverts airflow from the plurality of heat exchangers when the check valve is open.

12. An environmental control system comprising:

a rotary machine comprising:

a compressor section comprising:

a compressor inlet;

a compressor outlet;

a compressor duct extending between the compressor inlet and the compressor outlet; and a compressor impeller positioned in the compressor duct;

a turbine section comprising:

a turbine inlet downstream from the compressor outlet of the compressor section;

a turbine outlet;

a turbine duct extending between the turbine inlet and the turbine outlet; and a turbine impeller positioned in the turbine duct;

a second turbine section comprising:

a second turbine inlet downstream from the turbine outlet;

a second turbine outlet;

a second turbine duct extending between the second turbine inlet and the second turbine outlet; and a second turbine impeller positioned in the second turbine duct; and a tie rod mechanically connecting the compressor impeller and the turbine impeller;

a bypass duct between the compressor inlet and the turbine;

a check valve in the bypass duct, wherein the check valve opens the bypass duct when a pressure in the compressor inlet is higher than a pressure in the turbine inlet; and wherein the bypass duct diverts airflow from the compressor section;

a second bypass duct between the turbine inlet and the second turbine inlet; and a second check valve in the second bypass duct, wherein the second check valve opens the second bypass duct when an air pressure in the turbine inlet is higher than an air pressure in the second turbine inlet.

13. The environmental control system of claim 12, and further comprising:

a plurality of heat exchangers between the compressor outlet and the turbine inlet;

wherein the bypass duct diverts airflow from the plurality of heat exchangers when the check valve is open.

14. The environmental control system of claim 12, wherein the check valve is chosen from the group consisting of ball check valves, spring-loaded ball check valves, flapper check valves, spring-loaded flapper check valves, seated check valves, and spring-loaded flapper check valves.

15. The environmental control system of claim 12, and further comprising:

a fan duct heat exchanger upstream from the compressor inlet of the rotary machine.

* * * * *